May 16, 1933. H. W. PORTER 1,909,846
SHEARING CUTTING TOOL
Filed June 13, 1930

Inventor:
Henry W. Porter,
by Emery, Booth, Varney & Townsend.
Attys

Patented May 16, 1933

1,909,846

UNITED STATES PATENT OFFICE

HENRY W. PORTER, OF BROOKLINE, MASSACHUSETTS, ASSIGNOR TO H. K. PORTER, INC., OF EVERETT, MASSACHUSETTS, A CORPORATION OF MASSACHUSETTS

SHEARING CUTTING TOOL

Application filed June 13, 1930. Serial No. 460,870.

This invention aims to provide a compact powerful shearing cutting tool for cutting thick sheet material and the like.

In the accompanying drawing I have shown for illustrative purposes a cutting tool capable of practising this invention, wherein.

Figure 1:
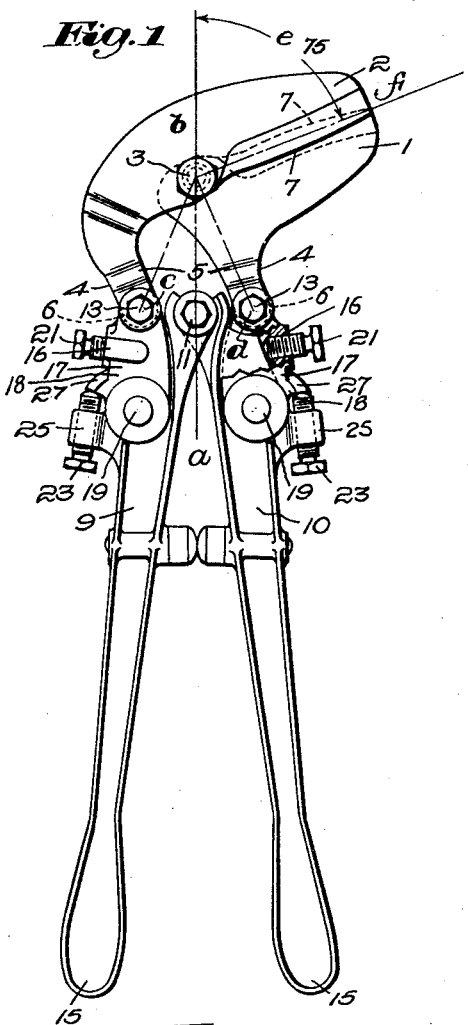
Fig. 1 is a side elevation of the cutting tool showing the jaws closed.
Figure 2:
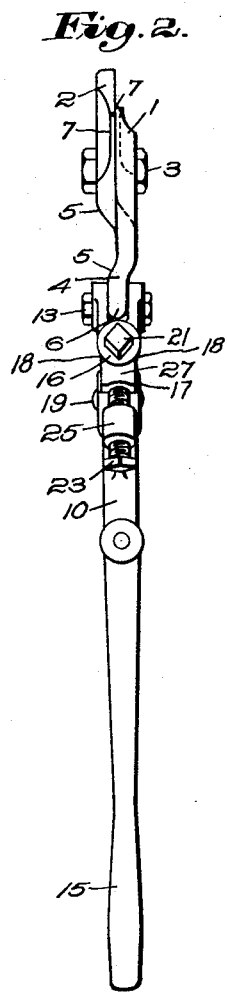
Fig. 2 is an edge view of the same.
Figure 3:
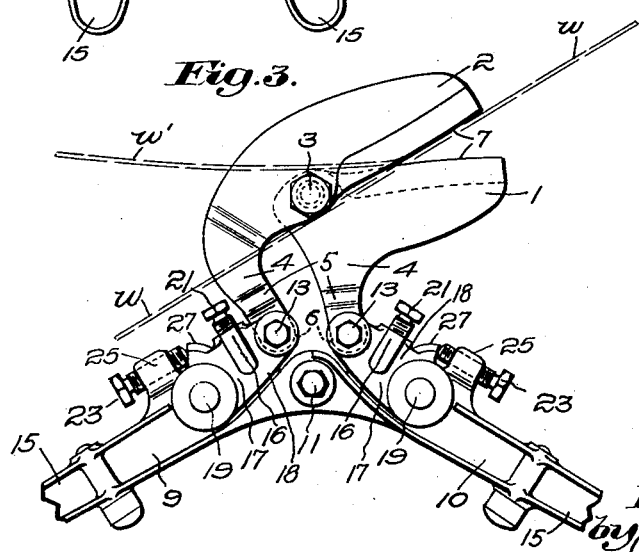
Fig. 3 is a side elevation of the cutting tool with the jaws swung open and in the process of cutting through a strip of sheet material, the operating handles being shown broken away to save space in the drawing.

The particular embodiment of the invention selected for purposes of illustration and shown in the drawing comprises cutting jaws 1 and 2 pivoted together at 3. The cutting jaws have operating arms 4 offset at 5 in opposite directions to bring the eyes or tails 6 of said arms into a common plane of operation, the central plane of which lies approximately coincident with the cutting edges 7 thereof.

The eyes 6, or tails so-called, in addition to being offset laterally, as shown at 5, are also arranged with the center line $a$—$b$ bisecting the angle $c$—$b$—$d$ described by the centers of the eyes 6 and passing through the pivotal center 3. The line $a$—$b$ forms an angle of approximately seventy-five degrees with the line $b$—$f$, as indicated by the arc $e$, which line $b$—$f$ represents the center line between the cutting edges 7. The jaws 1 and 2 are arranged to swing about the axis of the pivotal stud 3 with their edges 7 overlapping to produce a shearing cut upon the work $w$ placed between said jaws. Operating means are provided for the cutting jaws, desirably consisting of operating levers 9 and 10 pivoted together at 11 and also pivoted respectively to the operating arms 4 for the cutting jaws by means of screws 13. The operating levers 9 and 10 are provided with twin operating handles 15 of sufficient length to apply the necessary power through the operating arms 4 of the cutting jaws to the cutting edges.

Interposed between each eye 6 and its operating lever 9 or 10 is an adjusting link 17 pivoted at 19 to its respective operating lever which it straddles, and at 13 to its operating eye 6 which it likewise straddles. The links 17 are used to effect adjustment of the cutting jaws in order to vary the relation between each pivot 13 and the pivot 11 of said operating levers for the purpose of maintaining the desired relation between the edges of said cutting jaws 1 and 2 and to adjust said edges for wear. Adjusting screws 21 and 23 are provided for each of said links and cooperate to adjust their respective links angularly with respect to their operating levers and to maintain said links in adjusted relation. To this end the adjusting screw 21 extends through the back or intervening web 16, which ties together the two side members 18 of the U-shaped link 17, into engagement with the rear edge of the operating lever lying between the sides of said link, while the screw 23 has screw-threaded engagement with a lateral lug 25 and is movable into contact with a projecting lug 27 on the web 16 of said link. By releasing the screw 23 and tightening the screw 21, the axis of the screw 13 will be moved bodily away from the axis of the pivotal screw 11 for said operating levers, and obviously a reverse movement of said screws will move said axis bodily toward the axis of said screw 11. The adjustment of both levers will effect the proper overlapping of the cutting edges of said cutting jaws and this relation may be maintained regardless of the extent of wear upon the cutting edges. The greater the distance between the centers 13, 13, the greater will be the overlapping of the cutting edges.

The links and levers just described comprise toggle means which when operated in conjunction with the cutting jaws arranged as described provide means for cutting relatively heavy sheet material with great ease and without interference of the heavy sheet material with the tails 6 of the cutting jaws when a strip has been partially detached from the work because of the angular arrangement of said tails approximately at right angles to the plane of the work and for the reason that the partially severed portion $w'$ of the work will naturally curl slightly so as to pass above the pivot 3 of the cutting jaws and out of the device, while the tails of said cutting jaws and the connected operating levers will pass below the plane of said work $w$ by reason of the offsetting of said tails and the arrangement thereof at an angle of seventy-five degrees or thereabout to the center line of the cutting jaws.

The invention is not limited to the embodiment shown.

I claim:

Shears having, in combination, a pair of handle members pivotally connected adjacent one of the ends thereof, a pair of pivotally connected jaws having cooperating cutting edges comprising an upper jaw and a laterally opposed lower jaw, said jaws being positioned beyond the pivoted ends of said handle members with said cutting edges extending obliquely to said handle members, each jaw having an arm extending toward said handle members; that portion of the arm of the upper jaw which is opposite the cutting edge thereof being offset to lie entirely at the same side of the opposed surfaces of said jaws as said lower jaw, and the corresponding portion of the arm of the lower jaw also lying entirely at the same side of said opposed surfaces as said lower jaw; said two jaw arms being offset into substantially medial alignment with the plane of the opposed surfaces of the jaws between the aforesaid portions and their ends; and said arms also being respectively pivotally connected at their said ends to said handle members at points which are symmetrically disposed with relation to and at opposite sides of a plane passing through the pivotal connections of said jaws and handle members in all positions of the latter, whereby equal forces on said handle members throughout their range of movement are effective to impress equal closing forces on said jaws and the cutting edges of the latter are adapted to operate upon flat work lying in a plane which is wholly beyond all said pivotal connections.

In testimony whereof, I have signed my name to this specification.

HENRY W. PORTER.